Sept. 10, 1957  H. DE PAMPHILIS  2,805,510
FISHHOOK ANCHORING DEVICE
Filed Nov. 30, 1954
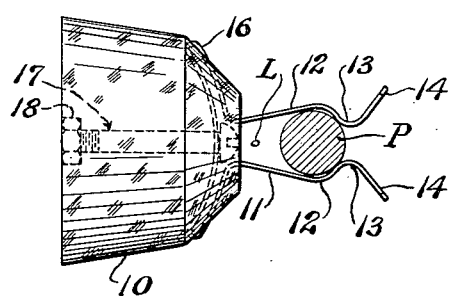
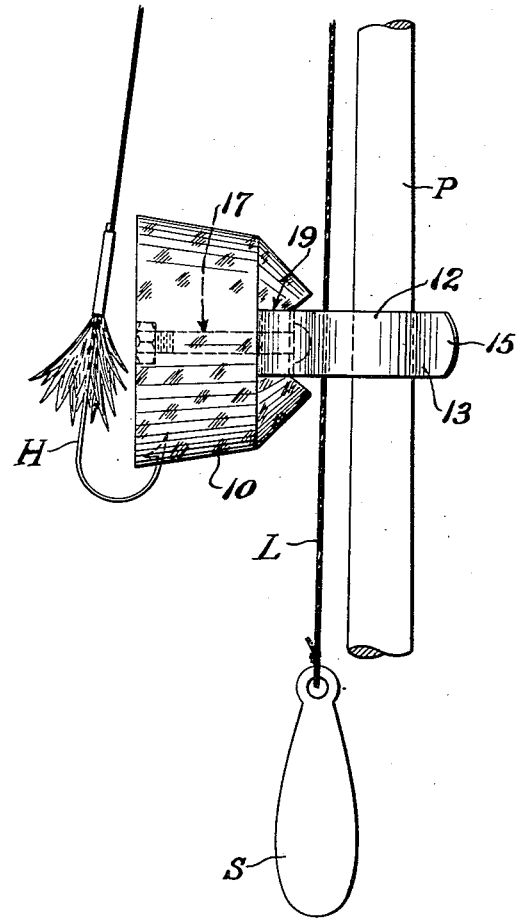
INVENTOR.
HUMBERT DE PAMPHILIS
BY
ATTORNEYS

United States Patent Office 2,805,510
Patented Sept. 10, 1957

2,805,510

FISHHOOK ANCHORING DEVICE

Humbert De Pamphilis, Whitestone, N. Y., assignor to Walco Bead Co., Inc., New York, N. Y., a corporation of New York Application November 30, 1954, Serial No. 472,053

4 Claims. (Cl. 43—25.2)

The invention relates to a device which is insertable on and removable from a fish pole for anchoring or securing a fishhook so that the hook barb is covered and the hook is anchored to the device. A fishing attachment of this kind should be inexpensive to manufacture, convenient to use and easy and effective in anchoring the fishhook.

It is an object of the invention to construct a hook anchoring device which is easily attachable on and removable from a fishing pole, effectively covers the barb, securely anchors the hook to the fish pole and is inexpensive to manufacture.

Another object is to construct a hook anchoring device which will also retain or hold captive the sinker attached to the fish line.

Other objects of the invention will be more apparent from the following description when taken in connection with the accompanying drawings illustrating a preferred embodiment of the invention in which:

Figure 1 is a top view of the fishhook anchoring device mounted on a fishing pole; and Figure 2 is a side view of the fishhook anchoring device mounted on a fish pole and with a fishhook secured thereto.

The fishhook anchoring device includes a fishhook receiving member of some yieldable and retentive material 10 such as cork, balsa wood, rubber and the like, which carries a spring clip 11 at one end thereof having a pair of flexible arms 12 which can be snapped over and grip a fish pole P. Each spring arm has an inwardly directed shoulder 13 forming a notch for retaining the fish pole between the arms of the spring clip and a camming end 14 so that the arms of the spring clip can be easily spread by pushing them against the fish pole. The spring clip has a base 16 which is secured to the cork in any suitable fashion that illustrated including a screw or rivet 17 extending centrally through the hook receiving member and a nut or washer 18 at the other end of the member. Preferably the hook receiving member has a groove or channel 19 across the end thereof to positively secure or retain the spring clip 11 or fishhook receiving member from turning with respect to the other.

The arms 12 are longer than the diameter of the fish pole received therein so that there is a space between the arms, the fish pole and the cork. The line L carrying the sinker S may be received in this space and secure or hold captive the sinker to the rod or retain it against free movement upon the rod. The fishhook is anchored by pressing the barb of the hook H into the hook receiving member. It will be seen therefore that the fishhook anchoring means protects the barb as well as anchors the hook to the fish pole. It may also be used to retain or hold captive the sinker close to the pole. The anchorage device is easily and quickly attached to and removed from the fish pole when it is desired to use the pole. In consisting of a few number of parts the anchorage device is inexpensive to manufacture and assemble.

This invention is presented to fill a need for improvements in a fishhook anchoring device. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A fishhook anchoring device comprising a fishhook receiving member of cork and having opposite ends, said hook receiving member having a groove across one of the ends; a spring clip having a base, a pair of spaced flexible arms integral with the base, an inwardly directed shoulder on each flexible arm, and an outwardly angled camming end on each arm; and means projecting into the center of the hook receiving member and securing the base of the spring clip within the groove in the hook receiving member thereby exposing the entire peripheral side surface of said member.

2. A fishhook anchoring device comprising a fishhook receiving member of cork and having opposite ends, there being a groove across one of the ends of the hook receiving member; a spring clip having a base, a pair of spaced flexible arms, an inwardly directed shoulder on each flexible arm, and an outwardly angled camming end on each arm; means securing the base of the spring clip within the groove in the hook receiving member to retain the latter against turning, and the arms of the spring clip being relatively long between the inwardly directed shoulder and the base to leave a space between the base and a fish pole for receiving a sinker line.

3. A fishhook anchoring device to be snapped on a fishing pole comprising a fishhook receiving member of cork and having opposite ends; a spring clip having a base, a pair of spaced flexible arms integral with the base, each of said arms having an inwardly directed shoulder forming a pole receiving notch and spaced from the base, and an outwardly angled camming end on each arm; and a screw passing through the base and the center of the fishhook receiving member to secure the base of the spring clip to an end of the hook receiving member and exposing the entire pheripheral side surface of the latter.

4. A fishhook anchoring device as in claim 3, and said hook receiving member having a groove across one of the ends, said groove being of a width to receive the base of the spring clip to prevent the hook receiving member from turning with respect to said clip.

References Cited in the file of this patent

UNITED STATES PATENTS

| | | |
|---|---|---|
| 612,844 | Headly | Oct. 25, 1898 |
| 834,056 | Hildreth | Oct. 23, 1906 |
| 1,531,725 | Baker | Mar. 31, 1925 |
| 1,550,080 | Lehrritter | Aug. 18, 1925 |
| 1,582,196 | Van Blarcom | Apr. 27, 1926 |
| 1,845,196 | Schaff | Feb. 16, 1932 |
| 1,906,874 | Platt | May 2, 1933 |
| 2,028,477 | Rupp | Jan. 21, 1936 |
| 2,555,053 | Myrick et al. | May 29, 1951 |

FOREIGN PATENTS

| | | |
|---|---|---|
| 77,882 | Sweden | July 25, 1933 |